(12) United States Patent
Hsieh

(10) Patent No.: US 7,179,432 B2
(45) Date of Patent: Feb. 20, 2007

(54) CORONA GENERATOR STRUCTURE

(75) Inventor: Ting-Shin Hsieh, San Chung (TW)

(73) Assignee: Xetin Co., Ltd., Taipei (TW)

( * ) Notice: Subject to any disclaimer, the term of this patent is extended or adjusted under 35 U.S.C. 154(b) by 723 days.

(21) Appl. No.: 10/608,033

(22) Filed: Jun. 30, 2003

(65) Prior Publication Data

US 2004/0265192 A1 Dec. 30, 2004

(51) Int. Cl.
*B01J 19/08* (2006.01)
*C01B 13/11* (2006.01)

(52) U.S. Cl. .......................... 422/186.04; 422/186.18; 313/244; 313/246; 313/247

(58) Field of Classification Search .......... 422/186.04, 422/186.18; 313/247, 244, 246
See application file for complete search history.

(56) References Cited

U.S. PATENT DOCUMENTS 5,147,614 A * 9/1992 Conrad .................. 422/186.18

5,502,346 A * 3/1996 Hsieh ......................... 313/247

* cited by examiner

*Primary Examiner*—Arun S. Phasge
(74) *Attorney, Agent, or Firm*—Rosenberg, Klein & Lee

(57) ABSTRACT

An improved corona generator structure includes a ground tube body sheathed within an insulating sleeve. One end of the ground tube body is provided with a sealing lid for being firmly coupled to the end portion of the ground tube body. At least one piece of high voltage electrode plate is coupled with the insulating sleeve. The high voltage electrode plate is provided with a plurality of spacers for allowing a gap of a substantially equal height to be formed between every area of the high voltage electrode plate and the insulating sleeve so as to uniformly distribute the corona on the high voltage electrode plate when electricity conducts therethrough. Furthermore, the two retaining sleeves are coupled to both end portions of the high voltage electrode plate and the insulating sleeve such that the high voltage electrode plate is firmly positioned on the insulating sleeve. By means of exposure of the high voltage electrode plate, a user can detach and wash the corona generator quickly and achieve efficacy of heat dissipation.

8 Claims, 5 Drawing Sheets

CORONA GENERATOR STRUCTURE

BACKGROUND OF THE INVENTION

1. Field of the Invention

The present invention relates to an improved corona generator structure, and more particularly to an improved corona generator structure, which is advantageous for being quickly disassembled by a user to be washed and facilitating heat dissipation.

2. Description of the Prior Art

FIGS. 1A and 1B are schematic diagrams showing a conventional corona generator. The corona generator comprises a housing 1. The housing 1 has a slot 11 penetrating a central portion thereof. A ground plate 12 and a high voltage electrode plate 13 are provided within the slot 11. The surface of the ground plate 12 is applied with an insulating layer 14 to seal the ground plate 12 so as to prevent a short circuit between the ground plate 12 and the high voltage electrode plate 13. The high voltage electrode plate 13 has thereon a plurality of holes 131. These holes 131 are coupled to corresponding retaining posts 15. The ends of the retaining posts 15 are inserted and penetrated through these holes 131 and urged against the insulating layer 14 such that a gap 16 of a substantially equal height is formed between the high voltage electrode plate 13 and the insulating layer 14 so as to facilitate guidance of gas flow.

However, since the conventional corona generator described above is made by enclosing the ground plate 12 and the high voltage electrode plate 13 in the housing, some contaminated substances such as dust, smoke or nicotine might readily adhere to the high voltage electrode plate 13 within the housing 1 over a prolonged period of time. Thus, the corona fails to be uniformly distributed in the high voltage electrode plate 13. Furthermore, since the housing 1 is enclosed and undetachable and the size of the slot is relatively small, the user fails to wash the high voltage electrode plate 13. After a prolonged use, the corona generator will be damaged. In addition, enclosing the high voltage electrode plate 13 in the housing 1 might lead to slow heat dissipation and thus the life thereof is shortened. Therefore, such corona generator needs to be improved.

Accordingly, the above-described prior art product is not a perfect design and has still many disadvantages to be solved In views of the above-described disadvantages resulted from the conventional corona generator, the applicant keeps on carving unflaggingly to develop an improved corona generator structure according to the present invention through wholehearted experience and research.

SUMMARY OF THE INVENTION

It is an object of the present invention to provide a quickly detachable corona generator, which is advantageous for individually removing the contaminated substances adhered to every component of the corona generator so as to uniformly distribute the corona on the high voltage electrode plate.

It is another object of the present invention to provide an improved corona generator structure, in which the high voltage electrode plate is exposed to the surrounding and covers a surface of an insulating sleeve so as to dissipate heat very quickly.

The above objects can be achieved by using an improved corona generator structure comprising a ground tube body, an insulating sleeve, a sealing lid, high voltage electrode plates, a plurality of spacers and retaining sleeves. The ground tube body is sheathed within an insulating sleeve. One end of the ground tube body is provided with a sealing lid for being firmly coupled on the end portion of the ground tube body. At least one piece of high voltage electrode plate is coupled with the insulating sleeve and provided with a plurality of apertures and a plurality of venting ports. An inner side of the aperture is engaged with a spacer. By means of these spacers, a gap of a substantially equal height is formed between every area of the high voltage electrode plate and the insulating sleeve so as to uniformly distribute the corona on the high voltage electrode plate when electricity conducts therethrough. Furthermore, the two retaining sleeves are coupled to both end portions of the high voltage electrode plate and the insulating sleeve such that the high voltage electrode plate is firmly positioned on the insulating sleeve.

Therefore, the components of the present invention are engaged with each other without using any fasteners such that these components are either assembled or detached very conveniently and quickly. Once each component is adhered with some contaminated substances such as dust or smoke, the user can detach and disassemble each component for being individually washed, thereby uniformly distributing the corona onto the high voltage electrode plate. In addition, the high voltage electrode plate of the present invention is exposed outside the external surface of the insulating sleeve, thereby increasing the speed of heat dissipation.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The present invention will become more clearly by the following detailed description.

Figure 1:
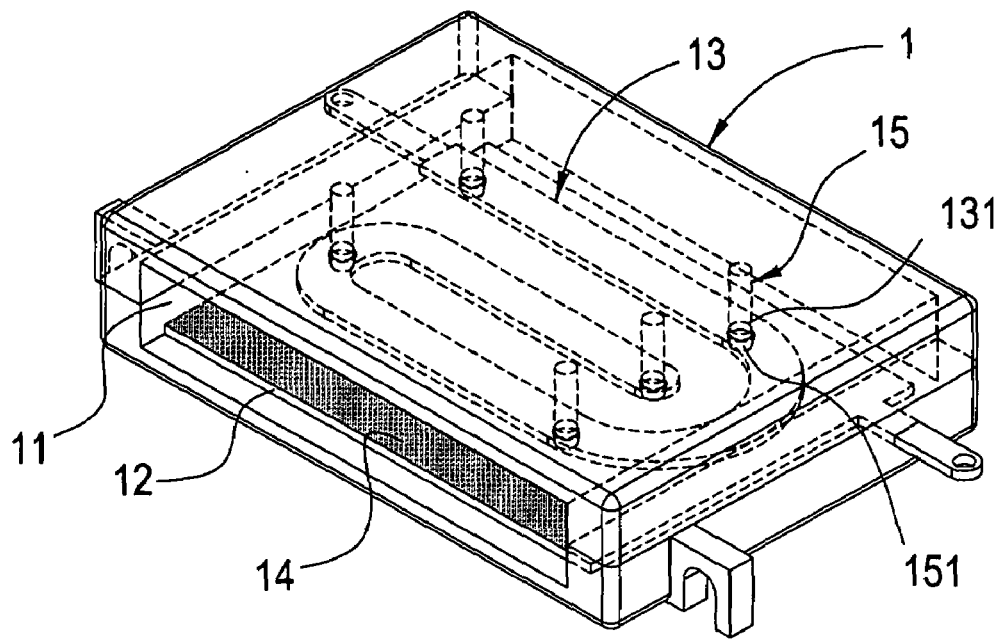
FIGS. 1A and 1B are schematic views illustrating a corona generator according to prior art.
Figure 1:
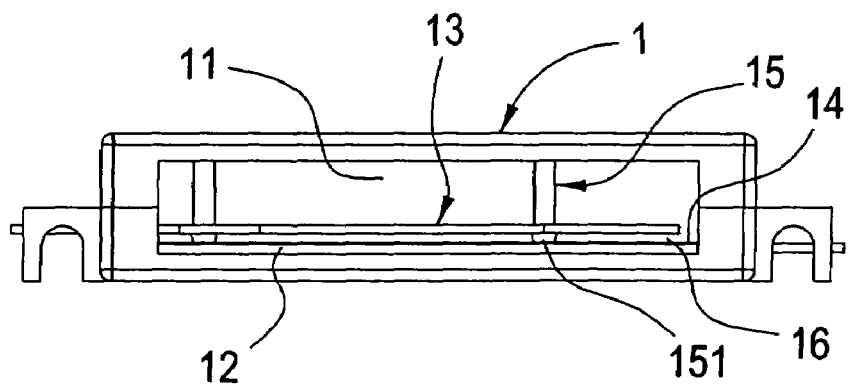
Figure 2A:
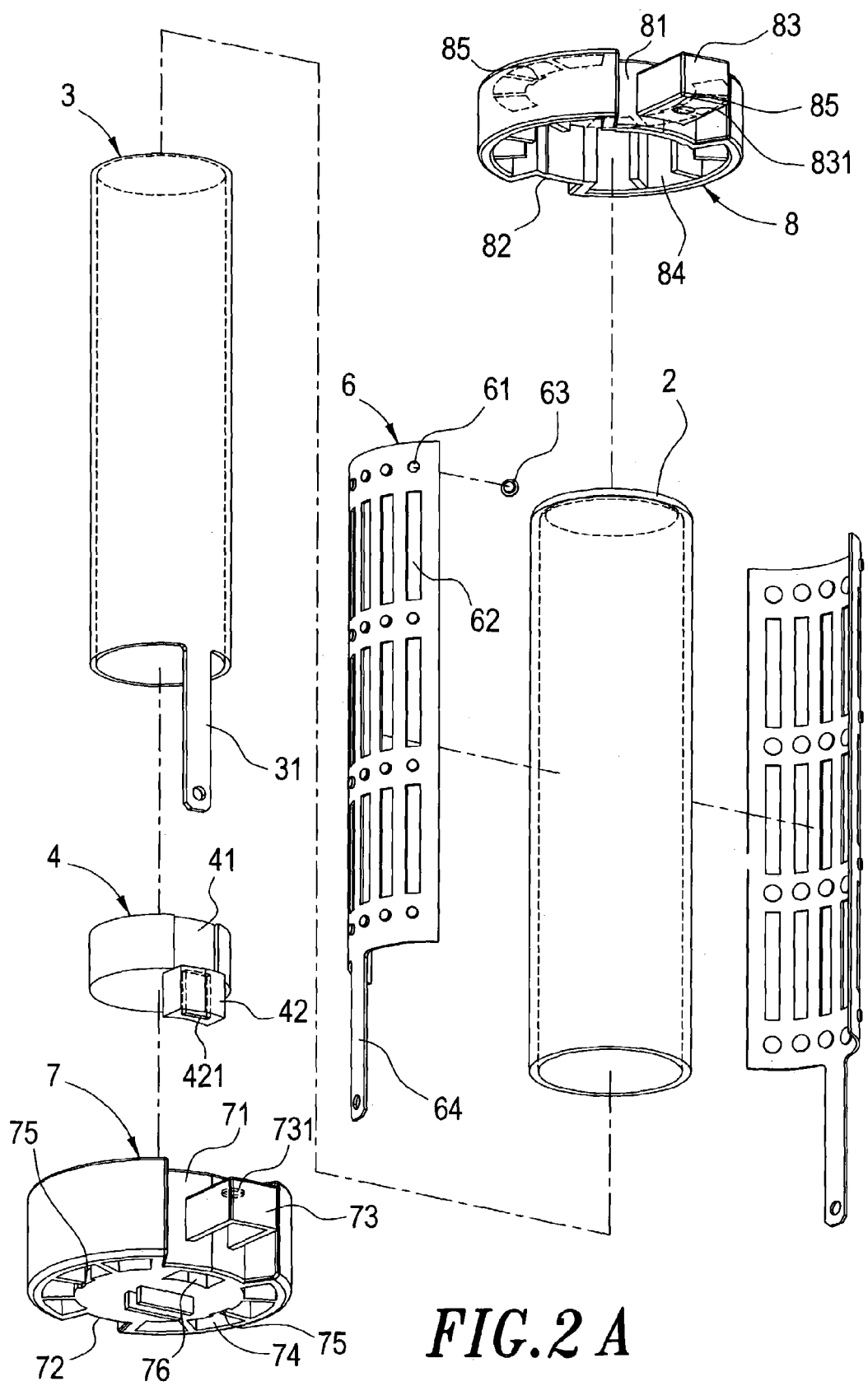
FIGS. 2A and 2B are exploded views illustrating an improved corona generator structure according to the present invention.
Figure 2:
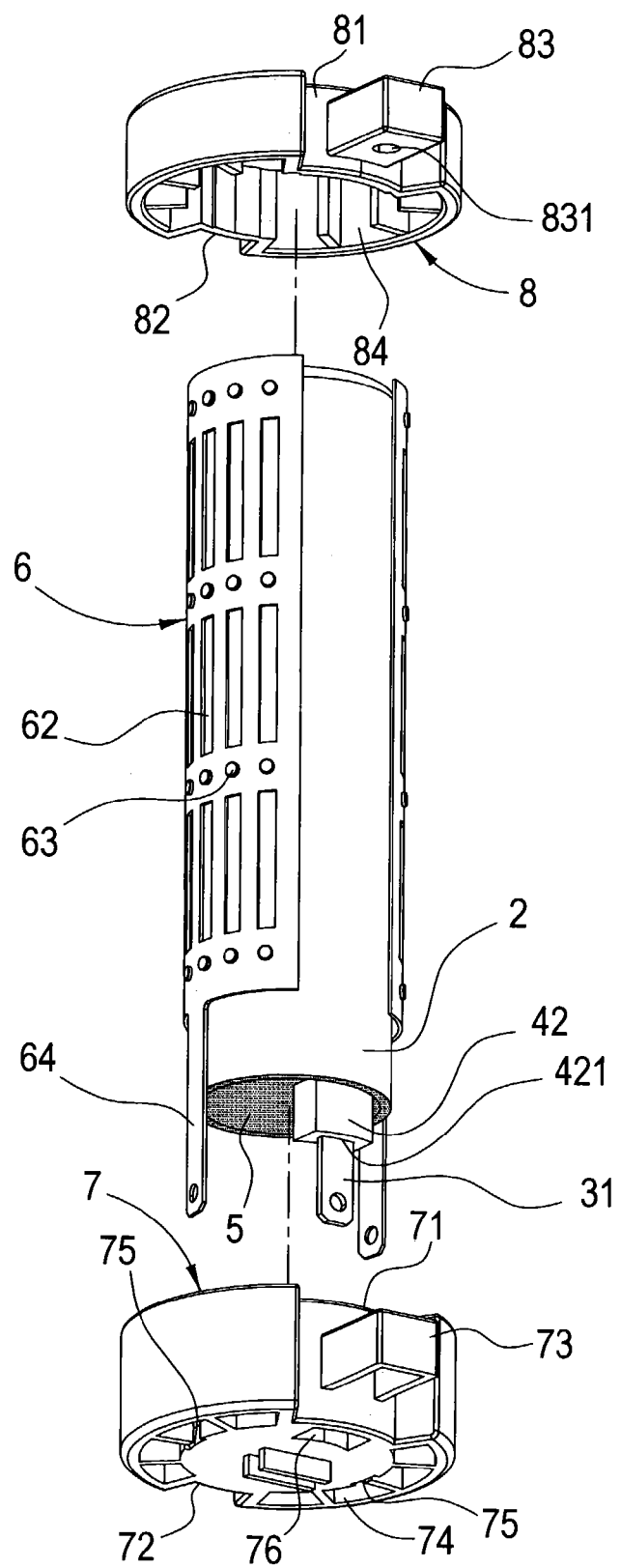
Figure 3:
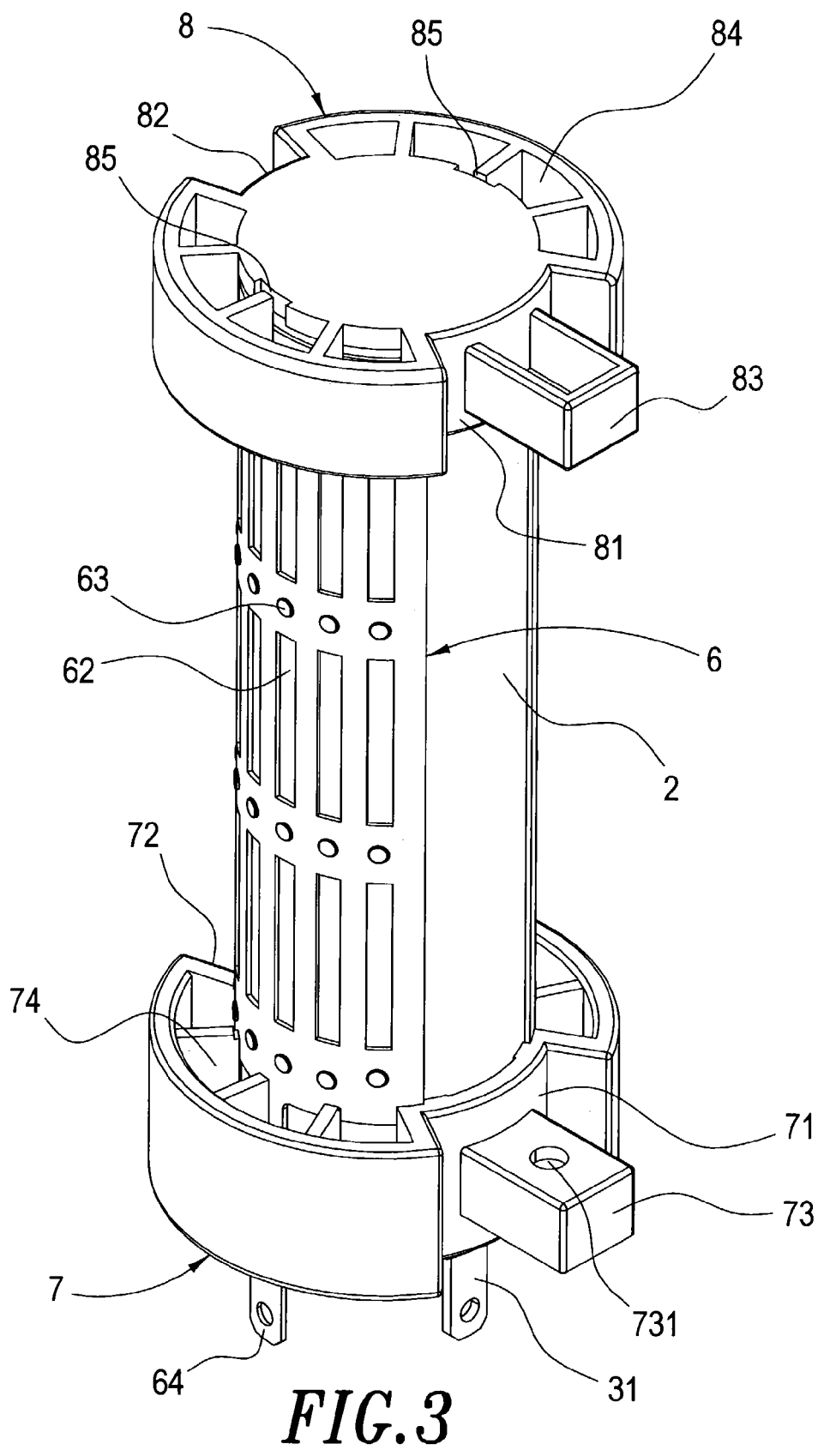
FIG. 3 is a three-dimensional assembly view of the improved corona generator structure.

FIGS. 2A and 3 are an exploded view and a three-dimensional assembly view illustrating an improved structure of the corona generator according to the present invention, respectively. Such improved structure comprises an insulating sleeve 2, a ground tube body 3, a sealing lid 4, two high voltage electrode plates 6, and a first and a second retaining sleeves 7 and 8.

The insulating sleeve 2 possesses an insulating effect and can be a glassy sleeve, a plastic sleeve or other insulating sleeve.

The ground tube body 3 is a hollow tube body and has a connecting plate 31 extending from an end thereof. The ground tube body 3 is sheathed within the insulating sleeve 2 and the connecting plate 31 thereon penetrates outside the insulating sleeve 2.

The sealing lid 4 is provided with a recess 41 on a side thereof and has a salient 42 protruded from a top edge of the recess 41. The salient 42 is also provided with a port 421 corresponding to the recess 41. The sealing lid 4 is coupled within the insulating sleeve 2 and connected to the end portion of the ground tube body 3 such that the connecting plate 31 of the ground tube body 3 penetrates through and outside the port 421. Thus, the sealing lid 4 seals the open end of the ground tube body 3 tightly. In addition, the top surface of the sealing lid 4 is at a same level with the top surface of the insulating sleeve 2, and an insulating layer 5 is coated onto the top surfaces of the sealing lid 4 and the insulating sleeve 2 so as to seal the sealing lid 4 and the ground tube body 3 in the insulating sleeve 2.

Each high voltage electrode plate 6 has a concave and cambered shape and uniformly provided with a plurality of apertures 61 and a plurality of venting ports 62. The inner side of each aperture 61 is engaged with a spacer 63. The high voltage electrode plate 6 has a conductive plate 64 extending from an end thereof. The high voltage electrode plate 6 is covered on the external surface of the insulating sleeve 2, and the conductive plate 64 on the high voltage electrode plate 6 penetrates through and outside the insulating sleeve 2. With the support of the spacers 63, the gap of a substantially equal height is formed between every area of the high voltage electrode plate 6 and the insulating sleeve 2 so as to uniformly distribute the corona on the high voltage electrode plate 6 and reduce sound volume produced from the corona when electricity conducts therethrough.

Both sides of the first and the second retaining sleeves 7 and 8 are provided with notches 71, 72, 81 and 82 opposite to each other. Two fixing posts 73 and 83 are extended from the notches 71 and 81, respectively. The fixing posts 73 and 83 are provided with connecting ports 731 and 831, respectively. Furthermore, the side peripheries of the first and the second retaining sleeves 7 and 8 are provided with multiple wind-guiding channels 74 and 84 corresponding to each other. In addition, two inserting ports 75 and 85 are provided on opposite surface thereof, and a retaining port 76 is provided on a proper position of the first retaining sleeve 7. These two retaining sleeves are coupled with both end of the insulating sleeve 2 such that the salient 42 of the sealing lid 4 penetrates through and outside the retaining port 76 of the first retaining sleeve 7. Correspondingly, the connecting plate 31 of the ground tube body 3 protrudes outside the first retaining sleeve 7, and the conductive plate 64 of the high voltage electrode plate 6 penetrates outside the inserting ports 75 of the first retaining sleeve 7 such that both end portions of the high voltage electrode plate 6 are clamped by the first and the second retaining sleeves 7 and 8 so as to be firmly positioned on a surface of the insulating sleeve 2.

The components described above are assembled to form an improved corona generator structure of the present invention.

Figure 4:
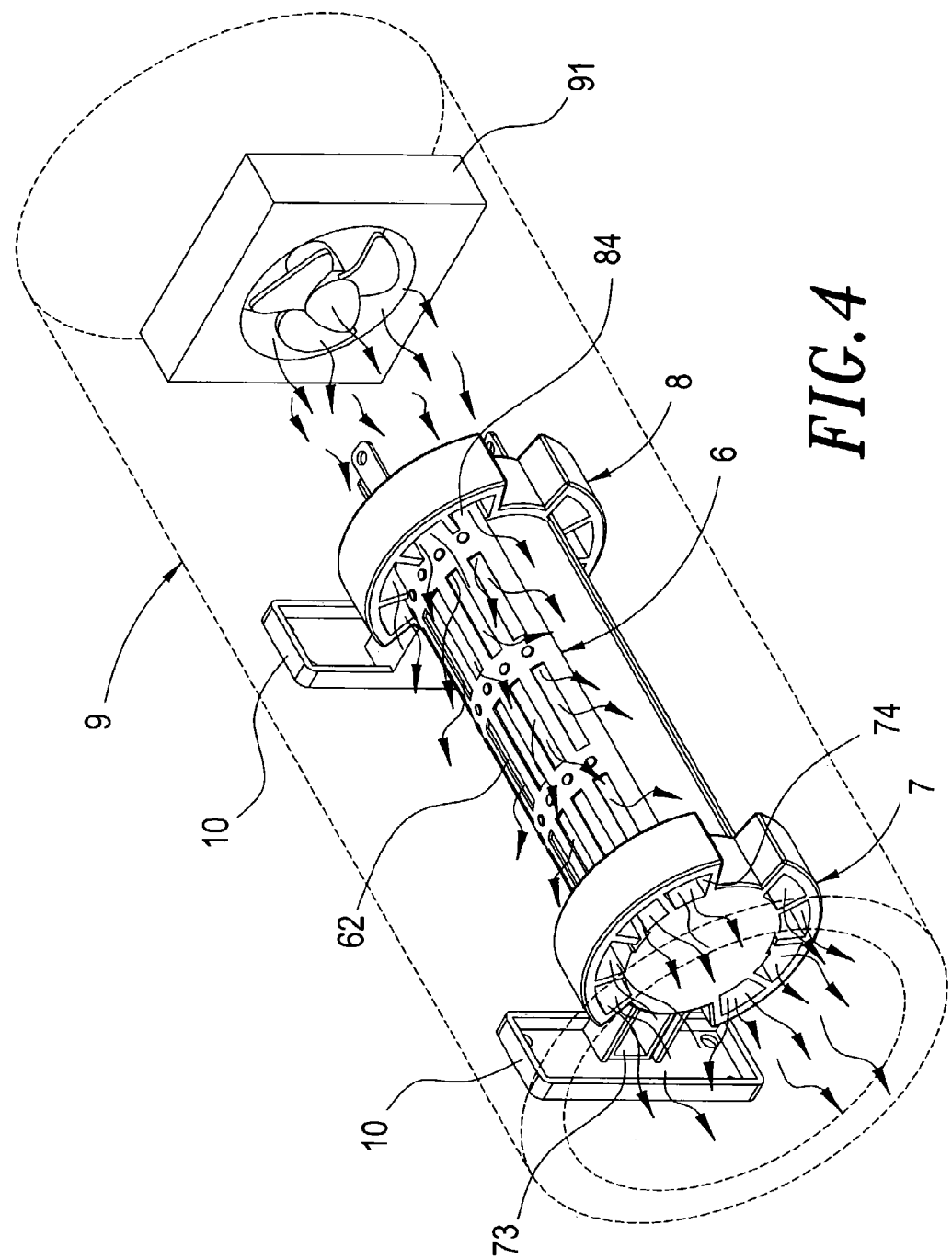
FIG. 4 is a schematic view illustrating an embodiment of the improved corona generator structure.

Please also refer to FIG. 4, which is a schematic view illustrating implementation of the improved corona generator structure. Take an ozonizer 9 as an example. Each fixing posts 73 and 83 of the first and the second retaining sleeves 7 and 8 is coupled with a pedestal 10 and thus coupled within the ozonizer 9 via the pedestals 10. When a wind is produced by a fan 91 within the ozonizer 9, the wind will flow to the high voltage electrode plate 6 via the wind-guiding channels 74 and 84 of the retaining sleeves and vented via the venting ports 62 of the high voltage electrode plate 6 such that gases can pass throughout the high voltage electrode plate 6. The gases passing through the high voltage electrode plate 6 become ozone with a disinfecting capability so as to clarifying the air passing therethrough. Furthermore, since the high voltage electrode plate 6 is exposed outside the insulating sleeve 2, the heat dissipation thereof is relatively speedy, thereby providing efficacy of increasing quantity of generated ozone.

The improved corona generator structure provided by the present invention has following advantages when compared with other prior art:

1. The components of the present invention are engaged with each other without using any fasteners. Therefore, it is very convenient and fast to assemble and detach these components. Once each component is adhered with some contaminated substances such as dust or smoke, the user can detach and disassemble each component for individually washing the component, thereby uniformly distributing the corona onto the high voltage electrode plate.

2. For increasing the speed of heat dissipation, the high voltage electrode plate of the present invention is covered on the external surface of the insulating sleeve. When it is applied to an ozonizer, the efficacy of increasing quantity of generated ozone can be achieved.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An improved corona generator structure, comprising essentially of:
   an insulating sleeve possessing an insulating effect;
   a ground tube body having a connecting plate extending from an end thereof, wherein said ground tube body is sheathed within said insulating sleeve, and said connecting plate thereon penetrates outside said insulating sleeve;
   a sealing lid having a salient protruded from a top edge thereof, said salient being provided with a port, wherein said sealing lid is coupled within said insulating sleeve and connected to an end portion of said ground tube body such that said connecting plate of said ground tube body penetrates through and outside said port, and an insulating layer is coated onto the top surfaces of said insulating sleeve so as to seal said sealing lid and said ground tube body in said insulating sleeve;
   at least one piece of high voltage electrode plate uniformly provided with a plurality of apertures and a plurality of venting ports, an inner side of said aperture being engaged with a spacer, a conductive plate being extended from an end of said high voltage electrode plate, wherein said high voltage electrode plate is disposed onto an external surface of said insulating sleeve, and said conductive plate thereon penetrates through and outside said insulating sleeve; and
   a first and a second retaining sleeves provided with two multiple wind-guiding channels corresponding to each other on side peripheries thereof, two inserting ports on opposite surface thereof, and a retaining port on a proper position of said first retaining sleeve, wherein said first and said second retaining sleeves are coupled with both end of said insulating sleeve such that said salient of said sealing lid penetrates through and outside said retaining port of said first retaining sleeve, and said conductive plate of said high voltage electrode plate penetrates outside said inserting ports of said first retaining sleeve such that both end portions of said high voltage electrode plate are clamped by said first and said second retaining sleeves so as to be firmly positioned on a surface of said insulating sleeve.

2. The improved corona generator structure according to claim 1, wherein said insulating sleeve is a glassy sleeve, a plastic sleeve or other insulating sleeve.

3. The improved corona generator structure according to claim 1, wherein said ground tube body is a hollow tube body.

4. The improved corona generator structure according to claim 1, wherein said sealing lid is provided with a recess on a side thereof, said recess being disposed corresponding to said port of said salient such that said connecting plate of said ground tube body penetrates through and outside said port of said salient.

5. The improved corona generator structure according to claim 1, wherein when said sealing lid is coupled within said insulating sleeve, the top surface of said sealing lid is substantially at a same level with the top surface of said insulating sleeve so as to facilitate application of said insulating layer.

6. The improved corona generator structure according to claim 1, wherein said high voltage electrode plate has a concave and cambered shape, and said spacer uniformly engaged thereon allows a gap of a substantially equal height to be formed between every area of said high voltage electrode plate and said insulating sleeve so as to uniformly distribute said corona on said high voltage electrode plate and reduce sound volume produced from said corona when electricity conducts therethrough.

7. The improved corona generator structure according to claim 1, wherein each of the both sides of said first and said second retaining sleeves is provided with a notch opposite to each other, a fixing post being extended from a notch thereof, said fixing post being provided with a connecting port for being coupled with a pedestal so as to be firmly coupled on a product to be implemented.

8. The improved corona generator structure according to claim 1, wherein the side peripheries of said first and said second retaining sleeves are provided with said multiple wind-guiding channels for guiding gases to flow.

* * * * *